(12) United States Patent
Yuan et al.

(10) Patent No.: US 10,272,441 B2
(45) Date of Patent: Apr. 30, 2019

(54) SYSTEM FOR SQUEEZING, SMASHING AND WINNOWING MUNICIPAL SOLID WASTE

(71) Applicant: GUANGZHOU INSTITUTE OF ENERGY CONVERSION, CHINESE ACADEMY OF SCIENCES, Guangzhou, Guangdong (CN)

(72) Inventors: Haoran Yuan, Guangzhou (CN); Tao Lu, Guangzhou (CN); Yazhuo Wang, Guangzhou (CN); Yong Chen, Guangzhou (CN); Chiguang Zhang, Guangzhou (CN)

(73) Assignee: GUANGZHOU INSTITUTE OF ENERGY CONVERSION, CHINESE ACADEMY OF SCIENCES, Guangdong (CN)

(*) Notice: Subject to any disclaimer, the term of this patent is extended or adjusted under 35 U.S.C. 154(b) by 450 days.

(21) Appl. No.: 15/033,511

(22) PCT Filed: Nov. 18, 2013

(86) PCT No.: PCT/CN2013/087329
§ 371 (c)(1),
(2) Date: Apr. 29, 2016

(87) PCT Pub. No.: WO2015/062128
PCT Pub. Date: May 7, 2015

(65) Prior Publication Data
US 2016/0250648 A1 Sep. 1, 2016

(30) Foreign Application Priority Data
Oct. 30, 2013 (CN) .......................... 2013 1 0526350

(51) Int. Cl.
*B03B 9/06* (2006.01)
*B02C 23/14* (2006.01)
(Continued)

(52) U.S. Cl.
CPC .......... *B02C 23/14* (2013.01); *B02C 18/0084* (2013.01); *B02C 21/00* (2013.01);
(Continued)

(58) Field of Classification Search
CPC ......... B02C 23/02; B02C 23/08; B02C 23/10; B02C 23/14; B02C 23/16; B02C 23/38
(Continued)

(56) References Cited

U.S. PATENT DOCUMENTS 4,119,024 A * 10/1978 White ..................... B30B 9/322
100/215
4,899,942 A * 2/1990 Bohringer ................. B02C 1/02
241/200

(Continued)

FOREIGN PATENT DOCUMENTS

CN 1322591 A 11/2001
CN 2765690 Y 3/2006
(Continued)

OTHER PUBLICATIONS

International Search Report dated Apr. 3, 2014, issued in counterpart International Application No. PCT/CN2013/087329 (3 pages).

*Primary Examiner* — Shelley M Self
*Assistant Examiner* — Bobby Yeonjin Kim
(74) *Attorney, Agent, or Firm* — Westerman, Hattori, Daniels & Adrian, LLP

(57) ABSTRACT

The invention discloses a system for squeezing, smashing and winnowing municipal solid waste (MSW). The system comprises a primary squeezing and smashing, device and a secondary smashing and winnowing device. The system of the invention has good effect m squeezing, smashing and winnowing, can greatly reduce the water content of MSW and efficiently separate the MSW into combustible matters and non-combustible matters, so as to facilitate further
(Continued)

subsequent utilization of the municipal waste; moreover, an upper jaw of a jaw crusher is connected with a spring device, so that the squeezing pressure, smashing effect and processing capacity of the jaw crusher can be adjusted according to the amount of the MSW. In addition, the system of the invention is further provided with emergency brake switches, spring protection devices and a sieve, so as to ensure the stability and the reliability of the system.

10 Claims, 1 Drawing Sheet

(51) Int. Cl.
    *B02C 23/38*     (2006.01)
    *B02C 23/16*     (2006.01)
    *B02C 23/02*     (2006.01)
    *B02C 23/10*     (2006.01)
    *B02C 21/00*     (2006.01)
    *B07B 4/02*     (2006.01)
    *B02C 18/00*     (2006.01)
    *B02C 23/08*     (2006.01)
    *B07B 9/00*     (2006.01)
    *B07B 1/12*     (2006.01)
    *B07B 11/06*     (2006.01)
    *B30B 9/06*     (2006.01)
(52) U.S. Cl.
    CPC .............. *B02C 23/02* (2013.01); *B02C 23/08* (2013.01); *B02C 23/10* (2013.01); *B02C 23/16* (2013.01); *B02C 23/38* (2013.01); *B03B 9/06* (2013.01); *B07B 1/12* (2013.01); *B07B 4/02* (2013.01); *B07B 9/00* (2013.01); *B07B 11/06* (2013.01); *B30B 9/062* (2013.01); *Y02W 30/521* (2015.05); *Y02W 30/523* (2015.05); *Y02W 30/525* (2015.05)
(58) Field of Classification Search
    USPC ............................................ 241/101.8, 152.2
    See application file for complete search history.

(56) References Cited

U.S. PATENT DOCUMENTS

| | | | | |
|---|---|---|---|---|
| 5,439,179 A | * | 8/1995 | Nolin | ...................... B02C 1/005 |
| | | | | 241/265 |
| 5,660,337 A | * | 8/1997 | Falbo | ...................... B02C 1/025 |
| | | | | 241/264 |
| 2002/0044828 A1 | * | 4/2002 | Olynyk | ................. B02C 21/026 |
| | | | | 404/72 |

FOREIGN PATENT DOCUMENTS

| | | | | |
|---|---|---|---|---|
| CN | 201058302 Y | | 5/2008 | |
| CN | 101259478 A | | 9/2008 | |
| CN | 101259479 A | | 9/2008 | |
| CN | 201260979 Y | | 6/2009 | |
| CN | 201912986 U | | 8/2011 | |
| CN | 202224199 U | | 5/2012 | |
| CN | 102604710 A | | 7/2012 | |
| CN | 202410796 U | | 9/2012 | |
| CN | 102913912 A | | 2/2013 | |
| CN | 202803735 U | | 3/2013 | |
| CN | 203061442 U | * | 7/2013 | |
| DE | 44 36 062 A1 | | 4/1996 | |
| JP | 11-197530 A | | 7/1999 | |
| JP | 11197530 A | * | 7/1999 | |
| JP | 2007-245023 A | | 9/2007 | |
| RU | 2 112 597 C1 | | 6/1998 | |
| WO | WO 9221441 A1 | * | 12/1992 | ............... B02C 1/02 |

\* cited by examiner

SYSTEM FOR SQUEEZING, SMASHING AND WINNOWING MUNICIPAL SOLID WASTE

FIELD OF THE INVENTION

The present invention relates to a municipal solid waste (MSW) pretreatment system, and specifically relates to a system for squeezing, smashing and winnowing municipal solid waste.

BACKGROUND OF THE INVENTION

According to the statistics, the delivering quantity of municipal solid waste in China was about 164 million tons in 2012, and which annually increases by 8-10% in recent years. Thus, the treatment of the national MSW has become one of important factors that influence urban sustainable development. In the long term, waste sorting is a fundamental method for solving the problem of MSW in China. However, since MSW is mostly collected without sorting at present, it is mainly treated in three ways: sanitary landfill, composting and incineration. Incineration can greatly reduce the volume and weight of the waste and produce clean electrical energy, and therefore has become a popular way for treating waste. However, municipal waste varies in component and size, particularly includes a large amount of kitchen waste, and is mostly collected in plastic bags, resulting in that the water content of the MSW is mostly more than 50%; in addition, the municipal waste contains non-combustible inorganic matters such as sand grains and glass; and due to the above problems, burning municipal waste is difficult and low in efficiency. Generally, light matters in MSW are combustibles, so separating the combustibles from municipal waste by squeezing smashing and winnowing is of great practical significance to volume reduction and energy regeneration of waste.

SUMMARY OF THE INVENTION

The object of the present invention is to provide a system for squeezing, smashing and winnowing MSW, which has good effect in squeezing, smashing and winnowing, and can greatly reduce the water content of MSW and separate municipal waste into combustible matters and non-combustible matters.

The present invention is implemented by the following technical solution:

A system for squeezing, smashing and :winnowing MSW, including a primary squeezing and smashing device and a secondary smashing and winnowing device; the primary squeezing and smashing device includes a feeding port of the primary squeezing and smashing device at the top thereof, a storage bin just below the feeding port, a hydraulic pushing device on the left of the storage bin, a squeezing zone on the right of the storage bin, a squeezing and smashing zone on the right of the squeezing zone, and a discharge port of the primary squeezing and smashing device on the right of the squeezing and smashing zone; a filter screen is mounted at the joint of the squeezing zone and the squeezing and smashing zone; a leachate pipeline is connected with the bottom of the filter screen; a jaw crusher is mounted in the squeezing and smashing zone; and the lower jaw of the jaw crusher is provided with apertures through which waste leachate flows down to the bottom surface of the squeezing and smashing zone:

the secondary smashing and winnowing device includes a feeding port of the secondary smashing and winnowing device at the top thereof, a smashing bin below the feeding port, a sieve below the smashing bin, a winnowing chamber below the sieve, and a conveying belt for receiving non-combustible matters below the winnowing chamber: a slow revolving knife and a fast revolving knife which are identical in revolving direction are arranged adjacently in the smashing bin, and the slow revolving knife is mounted just below the feeding port; a fin is mounted on the left of the winnowing chamber, and an arc-shaped separation plate for separating the waste into relatively light combustible matters and light combustible matters is mounted on the right of the winnowing chamber; and the running direction of the conveying belt for receiving the non-combustible matters is opposite to the wind direction;

a baffle and a conveying belt mounted above the baffle are arranged between the primary squeezing and smashing device and the secondary smashing and winnowing device; one side of the baffle is connected with the leachate pipeline of the primary squeezing and smashing device, and the other side is connected with the feeding port of the secondary smashing and winnowing device so that the leachate flows to the leachate pipeline; and the feeding end of the conveying belt is positioned below the discharge port of the primary squeezing and smashing device, and the discharge end of the conveying belt is positioned above the feeding port of the secondary smashing and winnowing device.

In the primary squeezing and smashing device, the maximum travel of a pushing rod of the hydraulic pushing device is up to the rightmost end of the storage bin.

The bottom surface of the squeezing zone inclines downwards from the leftmost end to the rightmost end, and the inclination angle is preferably 6-10°; and the bottom surface of the squeezing and smashing zone inclines downwards from the rightmost end to the leftmost end, and the inclination angle is preferably 6-10°.

Staggered acute-angled serrated smashing blades are uniformly mounted on the inner sides of the upper and lower jaws of the jaw crusher, and the angle between the knifepoint direction of the smashing blades and the feeding direction is acute angle; the lower jaw of the jaw crusher is fixed, and the upper jaw is connected with a spring device enabling the upper jaw to swing up and down, so that the jaw angle of the jaw crusher can be adjusted according to the amount of the MSW.

The slow revolving knife and the fast revolving knife arranged adjacently in the smashing bin are identical in revolving direction to ensure the formation of opposite tangential forces between the two revolving knives, and have different revolving speeds, wherein the revolving speed of the fast revolving knife is 5-10 times of that of the slow revolving knife, to ensure that the MSW is smashed by different knife points and the smashing effect is better; and the distance between the two revolving knives is set according to the smashing requirement of the garbage.

The left wall and the right wall of the smashing bin are walls with certain weight and able to swing, and emergency brake switches are mounted on the walls respectively. Spring protection devices are mounted between the central axis of the slow revolving knife and the left wall of the smashing bin and between the central axis of the fast revolving hide and the right wall of the smashing bin respectively.

The left and right walls of the smashing bin are vertical under the normal condition; when large hard matters (bricks, stones and the like) are stuck between the left wall and the slow revolving knife, the left wall swings from the vertical position to the left, and the emergency brake switch is triggered to perform shutdown protection; when relatively large matters and part of non-smashed matters are stuck between the two revolving knives, the two revolving knives are respectively pushed to the left wall and the right wall, so that the left wall swings leftwards, the right wall swings rightwards, and the emergency brake switches are triggered to perform shutdown protection; and when relatively large matters and part of non-smashed matters are stuck between the right wall and the fast revolving hide, the right wall swings from the vertical position to the right, and the emergency brake switch is triggered to perform shutdown protection.

The sieve is formed by a plurality of ropes and a rectangular base structure and is parallel to the cutting lines of the revolving knives; the ropes are all arranged in parallel on the rectangular base structure; one end of each rope is fixed on the rectangular base structure; and a heavy object is hung at the other end of the rope which goes through a slide fastener on the rectangular base structure.

The distance between the adjacent ropes is 50-80 mm.

The vertical distance between the sieve and the slow revolving knife and between the sieve and the fast revolving hide is 20-40 mm.

Because the sieve is parallel to the cutting lines of the revolving knives, when relatively large and heavy matters fall onto the sieve, the heavy matters are lifted, and meanwhile, the gaps of the sieve are enlarged; so that the relatively large and heavy matters fall onto the conveying belt for receiving non-combustible matters without damaging the sieve.

The conveying belt for receiving non-combustible matters is an adaptive conveying belt capable of changing the speed according to the load.

The present invention has advantages as follows:

the system of the present invention has good effect in squeezing, smashing and winnowing, can greatly reduce the water content of MSW, and can efficiently separate the MSW into combustible matters and non-combustible matters so as to facilitate further subsequent utilization of the municipal waste: moreover, since the upper jaw of the jaw crusher is connected with the spring device, the squeezing pressure, smashing effect and processing capacity of the jaw crusher can be adjusted according to the amount of the MSW In addition, the system is further provided with the emergency brake switches, the spring protection devices and the sieve, so as to ensure the stability and the reliability of the system.

Figure 1:
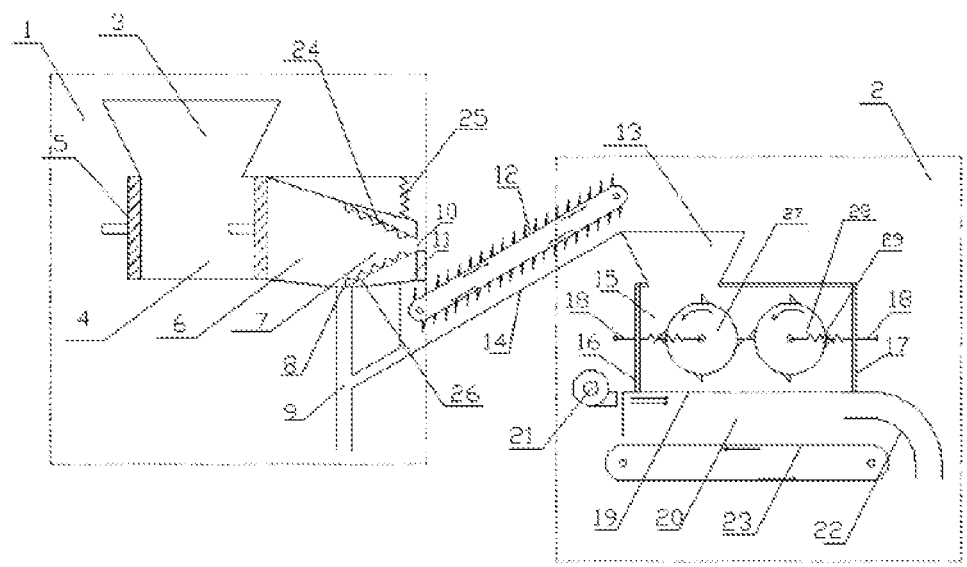
FIG. 1 is a structural schematic diagram of the present invention.
Figure 2:
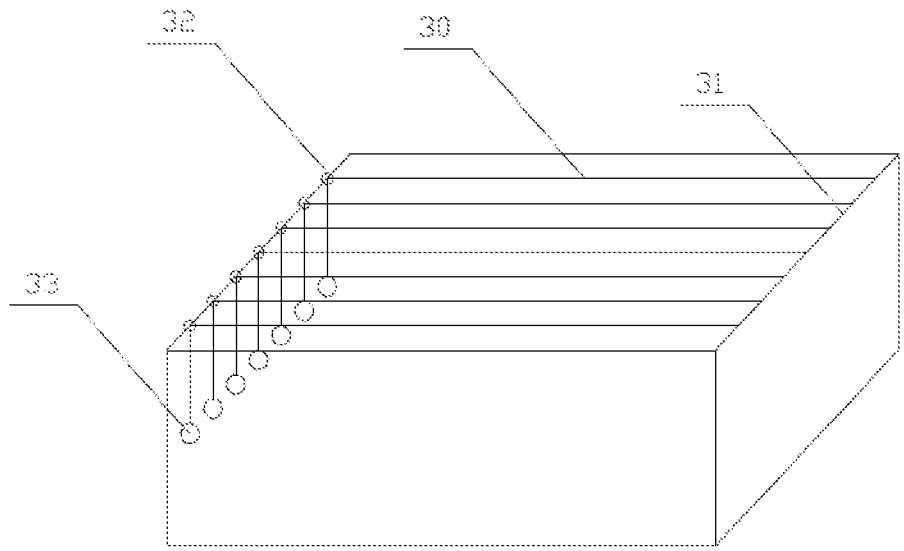
FIG. 2 is a structural schematic diagram of a sieve.

reference numerals: 1-primary squeezing and smashing device, 2-secondary smashing and winnowing device, 3-feeding port of the primary squeezing and smashing device, 4-storage bin, 5-hydraulic pushing device, 6-squeezing zone, 7-squeezing and smashing zone, 8-filter screen, 9-leachate pipeline, 10-discharge port of the primary squeezing and smashing device, 11-jaw crusher, 12-conveying belt, 13-feeding port of the secondary smashing and winnowing device, 14-baffle, 15-smashing bin, 16-left wall, 17-right wall, 18-emergency brake switch, 19-sieve, 20-winnowing chamber, 21-fan, 22-arc-shaped separation plate, 23-conveying belt for receiving non-combustible matters, 24-smashing blade, 25-spring device, 26-aperture, 27-slow revolving knife, 28-fast revolving life, 29-spring protection device, 30-rope, 31-rectangular base structure, 32-slide fastener, 33-heavy object.

DETAILED DESCRIPTION OF THE EMBODIMENTS

The present invention will be further described below, rather than being limited. As shown in FIG. 1, a system for squeezing, smashing and winnowing MSW includes a primary squeezing and smashing device 1 and a secondary smashing and winnowing device 2.

The primary squeezing and smashing device 1 includes a feeding port 3 of the primary squeezing and smashing device 1 at the top thereof a storage bin 4 just below the feeding port 3, a hydraulic pushing device 5 on the left of the storage bin 4, a squeezing zone 6 on the right of the storage bin 4, a squeezing and smashing zone 11 on the right of the squeezing zone 6, and a discharge port 10 of the primary squeezing and smashing device 1 on the right of the squeezing and smashing zone 11; a filter screen 8 is mounted at the joint of the squeezing zone 6 and the squeezing and smashing zone 11; a leachate pipeline 9 is connected with the bottom of the filter screen 8; a jaw crusher 7 is mounted in the squeezing and smashing zone 11; and the lower jaw of the jaw crusher 7 is provided with apertures 26 through which waste leachate flows down to the bottom surface of the squeezing and smashing zone 11. The secondary smashing and winnowing device 2 includes a feeding port 13 of the secondary smashing and winnowing device 2 at the top thereof, a smashing bin 15 below the feeding port 13, a sieve 19 below the smashing bin 15, a winnowing chamber 20 below the sieve 19, and a conveying belt 23 for receiving non-combustible matters below the winnowing chamber 20; a slow revolving knife 27 and a fast revolving knife 28 which are identical in revolving direction are arranged adjacently in the smashing bin 15, and the slow revolving knife 27 is mounted just below the feeding port 13; a fan 21 is mounted on the left of the winnowing chamber 20, and an arc-shaped separation plate 22 for separating the waste into relatively light combustible matters and light combustible matters is mounted on the right of the winnowing chamber 20; and the running direction of the conveying belt 23 for receiving non-combustible matters is opposite to the wind direction.

A baffle 14 and a conveying belt 12 mounted above the baffle 14 are arranged between the primary squeezing and smashing device 1 and the secondary smashing and winnowing device 2; one side of the baffle 14 is connected with the leachate pipeline 9 of the primary squeezing and smashing device 1, and the other side is connected with the feeding port 13 of the secondary smashing and winnowing device 2 so that the leachate flows to the leachate pipeline 9; the feeding end of the conveying belt 12 is positioned below the discharge port of the primary squeezing and smashing device 1, and the discharge end of the conveying belt 12 is positioned above the feeding port 13 of the secondary smashing and winnowing device 2.

In the primary squeezing and smashing device 1, the maximum travel of a pushing rod of the hydraulic pushing device 5 is up to the rightmost end of the storage bin 4. The bottom surface of the squeezing zone 6 inclines downwards from the leftmost end to the rightmost end, and the inclination angle is preferably 6-10'; and the bottom surface of the squeezing and smashing zone 11 inclines downwards from the rightmost end to the leftmost end, and the inclination angle is preferably 6-10'.

Staggered acute-angled serrated smashing blades 24 are uniformly mounted on the inner sides of the upper and lower jaws of the jaw crusher 7, and the angle between the knifepoint direction of the smashing blades 24 and the feeding direction is acute angle; the lower jaw of the jaw crusher 7 is fixed, and the upper jaw is connected with a spring device 25 enabling the upper jaw to swing up and down, so that the jaw angle of the jaw crusher can be adjusted according to the amount of the MSW.

The slow revolving knife 27 and the fist revolving knife 28 arranged adjacently in the smashing bin 15 are identical in revolving direction to ensure the formation of opposite tangential forces between the two revolving knives, and have different revolving speeds, wherein the revolving speed of the fast revolving knife 28 is 5-10 times of that of the slow revolving knife 27, so that the MSW can be smashed by different knife points and the smashing effect is better; and the distance between the two revolving knives is set according to the smashing requirement of the garbage. The left wall 16 and the right wall 17 of the smashing bin 15 are walls with certain weight and able to swing, and emergency brake switches 18 are mounted on the walls respectively; and spring protection devices 29 are mounted between the central axis of the slow revolving knife 27 and the left wall 16 of the smashing bin 15 and between the central axis of the fast revolving knife 28 and the right wall 17 of the smashing bin 15 respectively.

The left and tight walls of the smashing bin 15 are vertical under the normal condition; when relatively large hard matters and part of non-smashed matters are stuck between the left wall 16 and the slow revolving knife 27, the left wall 16 swings from the vertical position to the left, and the emergency brake switch 18 is triggered to perform shutdown protection; when relatively large matters and part of non-smashed matters are stuck between the two revolving knives, the two revolving knives are respectively pushed to the left wall 16 and the right will 17, so that the left wall 16 swings leftwards, the right will 17 swings rightwards, and the emergency brake switches 18 are triggered to perform shutdown protection: and when relatively large matters and part of non-smashed matters are stuck between the right wall 17 and the fast revolving knife 28, the right wall 17 swings from the vertical position to the right, and the emergency brake switch 18 is triggered to perform shutdown protection.

The sieve 19 is formed by ropes 30 and a rectangular base structure 31 and is parallel to the cutting lines of the revolving knives: the ropes 30 are all arranged in parallel on the rectangular base structure 31: one end of each rope 30 is fixed on the rectangular base structure 31; and a heavy matter 33 is hung at the other end of the rope 30 which goes through a slide fastener 32 on the rectangular base structure 31.

The distance between the adjacent ropes 30 is 50-80 mm.

The vertical distance between the sieve 19 and the slow revolving knife and between the sieve and the fast revolving knife is 20-40 mm.

Because the sieve 19 is parallel to the cutting lines of the revolving knives, when relatively large and heavy matters fall onto the sieve 19, the heavy matters are lifted, and meanwhile, the gaps of the sieve 19 are enlarged, so that the relatively large and heavy matters fall onto the conveying belt 23 for receiving non-combustible matters without damaging the sieve.

The conveying belt 23 for receiving non-combustible matters is an adaptive conveying belt capable of changing the speed according to the load.

The specific working process is as follows:

MSW enters the storage bin 4 through the feeding port of the primary squeezing and smashing device 1, the hydraulic pushing device 5 pushes the MSW to the squeezing zone 6, with increase of the MSW, a part of the MSW is squeezed by the hydraulic pushing device 5 and itself in the squeezing zone 6, and leachate flows out of the MSW; is collected on the bottom surface of the squeezing zone 6 and enters the leachate pipeline 9 via the filter screen 8. The other part of the MSW enters the squeezing and smashing one 11 and is further squeezed, and is smashed by the jaw-type crusher 7. More leachate flows out, and is collected on the bottom surface of the squeezing and smashing zone 11 via the apertures 26 in the lower jaw of the jaw crusher 7, and enters the leachate pipeline via the filter screen 8. The MSW smashed by the smashing blades 24 of the jaw crusher 7 is discharged from the discharge port 10 of the primary squeezing and smashing device 1, is transferred to the feeding port 13 of the secondary smashing and winnowing device 2 by the conveying belt 12, and enters the smashing bin 15. Leachate further flows out in the process of transferring the smashed MSW to the feeding port 13 of the secondary smashing and winnowing device 2 by the conveying belt 12, and enters the leachate pipeline 9 via the filter screen 8 along the baffle 14. The MSW entering, the smashing bin 15 is further smashed by the slow revolving knife 27 and the fast revolving knife 28, the MSW meeting the smashing requirement enters the winnowing, chamber 20 via the sieve 19, and combustible matters are further separated into light combustible matters and relatively light combustible matters by the arc-shaped separation plate 22. Relatively large and heavy non-combustible matters fall onto the sieve 19, heavy matters are lifted, and meanwhile, the gaps of the sieve 19 are enlarged, so that the relatively large and heavy non-combustible matters directly fall onto the conveying belt 23 for receiving non-combustible matters.

The invention claimed is:

1. A system for squeezing, smashing and winnowing municipal solid waste, comprising:
    a primary squeezing and smashing device including
        a feeding port at a top of the primary squeezing and smashing device,
        a storage bin below the feeding port,
        a hydraulic pushing device provided left of the storage bin,
        a squeezing zone provided right of the storage bin,
        a squeezing and smashing zone provided right of the squeezing zone,
        a discharge port provided right of the squeezing and smashing zone,
        a filter screen mounted at a joint of the squeezing zone and the squeezing and smashing zone,
        a leachate pipeline connected with a bottom of the filter screen, and
        a jaw crusher mounted in the squeezing and smashing zone, a lower jaw of the jaw crusher being provided with apertures through which waste leachate flows down to a bottom surface of the squeezing and smashing zone;
    a secondary smashing and winnowing device including
        a feeding port at a top of the secondary squeezing and smashing device,
        a smashing bin below the feeding port,
        a sieve below the smashing bin,
        a winnowing chamber below the sieve,
        a conveying belt which receives non-combustible matter below the winnowing chamber, a slow revolving knife and a fast revolving knife identical in revolving direction and which are arranged adjacent to each other in the smashing bin, the slow revolving knife being mounted below the feeding port, and a fan mounted on left of the winnowing chamber; and a baffle and a baffle conveying belt mounted above the baffle, disposed between the primary squeezing and smashing device and the secondary smashing and winnowing device;

wherein a first side of the baffle is connected with the leachate pipeline of the primary squeezing and smashing device, and a second side of the baffle is connected with the feeding port of the secondary smashing and winnowing device so that the waste leachate flows to the leachate pipeline;

wherein a feeding end of the baffle conveying belt is positioned below the discharge port of the primary squeezing and smashing device, and a discharge end of the baffle conveying belt is positioned above the feeding port of the secondary smashing and winnowing device; and wherein a running direction of the conveying belt of the secondary smashing and winnowing device is opposite to a wind direction of the fan.

2. The system of claim 1, wherein in the primary squeezing and smashing device, a maximum travel of a pushing rod of the hydraulic pushing device is up to a rightmost end of the storage bin.

3. The system of claim 1, wherein a bottom surface of the squeezing zone inclines downwards from a leftmost end to a rightmost end thereof, and wherein the bottom surface of the squeezing and smashing zone inclines downwards from a rightmost end to a leftmost end thereof.

4. The system of claim 3, wherein a downward inclination angle of the bottom surface of the squeezing zone from the leftmost end to the rightmost end thereof is 6-10°, and wherein a downward inclination angle of the bottom surface of the squeezing and smashing zone from the rightmost end to the leftmost end thereof is 6-10°.

5. The system of claim 1, wherein staggered acute-angled serrated smashing blades are uniformly mounted on inner sides of an upper jaw of the jaw crusher and the lower jaw of the jaw crusher;

wherein an angle between a knifepoint direction of the smashing blades and a feeding direction of the secondary smashing and winnowing device is an acute angle; and wherein the lower jaw of the jaw crusher is fixed, and the upper jaw is connected with a spring device such that the upper jaw can swing up and down.

6. The system of claim 1, wherein a revolving speed of the fast revolving knife in the smashing bin is 5-10 times of a revolving speed of the slow revolving knife.

7. The system of claim 1, wherein a left wall and a right wall of the smashing bin are able to swing, wherein emergency brake switches are mounted on the left and right walls respectively; and wherein spring protection devices are mounted between a central axis of the slow revolving knife and the left wall of the smashing bin and between a central axis of the fast revolving knife and the right wall of the smashing bin respectively.

8. The system of claim 1, wherein the sieve includes ropes and a rectangular base structure;

wherein the ropes are all arranged in parallel on the rectangular base structure;

wherein a first end of each rope is fixed on the rectangular base structure; and wherein a weight is hung at a second end of the rope, the second end of the rope passing through a slide fastener on the rectangular base structure.

9. The system of claim 8, wherein a distance between adjacent ropes is 50-80 mm.

10. The system of claim 1, wherein the conveying belt of the secondary smashing and winnowing device is an adaptive conveying belt capable of changing speed according to a load.

* * * * *